US012560259B1

(12) United States Patent
Blakely et al.

(10) Patent No.: US 12,560,259 B1
(45) Date of Patent: Feb. 24, 2026

(54) HOSE EXTENSION WITH HANDLE AND LIGHTING

(71) Applicant: CAMCO MANUFACTURING, LLC, Greensboro, NC (US)

(72) Inventors: Brandon Blakely, Burlington, NC (US); Gregory Walton, Kernersville, NC (US); Niko Jovicevic, Statesville, NC (US); Bruce Andrew Angel, Stokesdale, NC (US)

(73) Assignee: Camco Manufacturing, LLC, Greensboro, NC (US)

( * ) Notice: Subject to any disclaimer, the term of this patent is extended or adjusted under 35 U.S.C. 154(b) by 0 days.

(21) Appl. No.: 19/175,929

(22) Filed: Apr. 10, 2025

(51) Int. Cl.
F16L 3/10 (2006.01)
F21L 4/00 (2006.01)
F21V 21/08 (2006.01)
F21V 21/40 (2006.01)
F21Y 115/10 (2016.01)

(52) U.S. Cl.
CPC ............... F16L 3/1075 (2013.01); F21L 4/00 (2013.01); F21V 21/0816 (2013.01); F21V 21/406 (2013.01); *F21Y 2115/10* (2016.08)

(58) Field of Classification Search
CPC ........ F21L 3/10–1203; F21L 4/00–085; F21V 21/08–406; F21Y 2115/10
See application file for complete search history.

(56) References Cited

U.S. PATENT DOCUMENTS 5,448,459 A * 9/1995 Rogers .................. F21V 21/145
362/120

* cited by examiner

*Primary Examiner* — Jason M Han
(74) *Attorney, Agent, or Firm* — Tuggle Duggins P.A.; Blake P. Hurt

(57) ABSTRACT

Systems and methods for a hose extension handle system including a tubular grip with distinct first and second ends, a battery carrier within the first end's cavity to hold a battery, and an engageable actuator on the first end's outer surface that is electrically connected to the battery. From the second end of the grip extends a housing including a light source, also connected to the battery and actuator. An upper strap with two extending arms and a lower strap that can be attached to these arms may be configured to secure around a hose. The light source within the housing may be aimed to illuminate the inside of the hose.

20 Claims, 10 Drawing Sheets

100

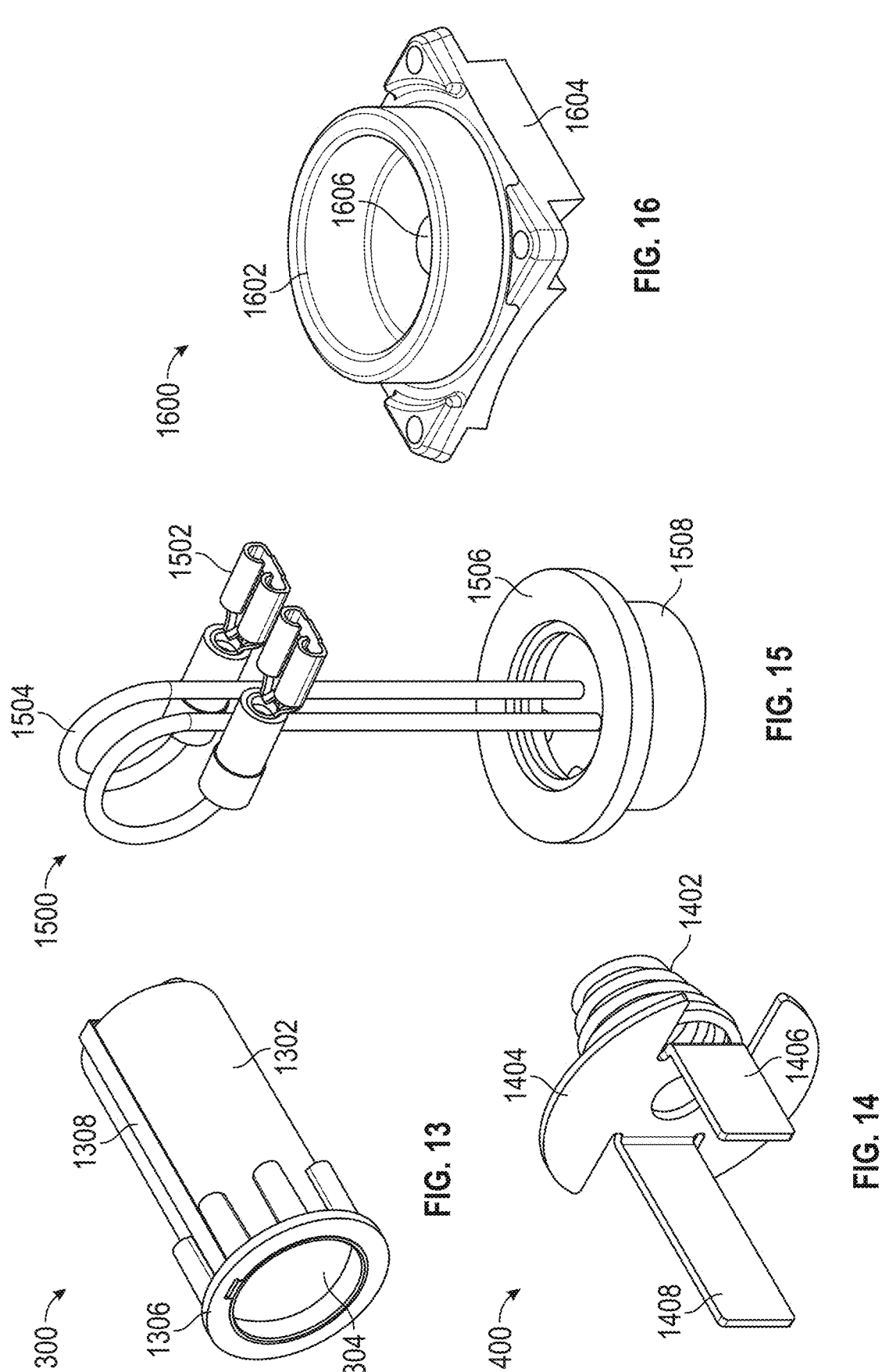

HOSE EXTENSION WITH HANDLE AND LIGHTING

TECHNICAL FIELD

The present disclosure relates generally to improving hose connections. In particular, some implementations may relate to systems for handling and illuminating a black or gray water hose connections when using a transparent hose extender.

DESCRIPTION OF RELATED ART

Managing wastewater efficiently and hygienically can be a significant challenge for recreational vehicle (RV) enthusiasts, particularly when it comes to disposing of black water, which contains human waste. RVs typically hold three primary types of water: fresh, gray, and black. Fresh water is stored for drinking and cooking, gray water collects from sinks and showers and contains soap particles and food residue, and black water, the most challenging to manage, comes from the toilet. Traditional methods of disposing of this waste involve connecting a sewer hose from one's RV to a designated disposal inlet, a task that requires precision and care to avoid environmental contamination and maintain hygienic conditions.

Conventionally, the primary tool for this task has been a sewer fitting wrench, designed to help secure the connection between the sewer hose and the disposal inlet. However, this tool has significant drawbacks. Not being attached to the hose or RV, these wrenches can be easily misplaced, making them unavailable or difficult to locate when needed. Moreover, the lack of a permanent attachment means that the connection can become insecure, leading to potential leaks or spills. This problem is compounded by the fact that the wrench may detach during use, requiring repeated adjustments and increasing the risk of an unsanitary situation.

An additional challenge arises when disposing of waste at night. The absence of adequate lighting can make it difficult to see the contents of the sewer hose and to ensure a secure connection to the disposal inlet. Traditionally, RV enthusiasts have had to use separate light sources to illuminate the work area, a solution that is both inconvenient and inefficient. This need for external lighting adds another layer of complexity to an already challenging task, making the process more cumbersome than necessary.

BRIEF SUMMARY OF THE DISCLOSURE

Embodiments of the present disclosure address these issues by providing for a handle with or without an integrated lighting system that secures to a hose extension. This design may allow for a secure grip and manipulation of the hose extension without the need for separate tools. This may significantly reduce the risk of leaks, spills, or disengagements. Embodiments with a built-in lighting system may supplement, or even eliminate the need for, an additional light source, improving users' ability to safely and efficiently manage waste disposal at any time of day or night. By simplifying the waste disposal process and adding features that enhance safety and convenience, embodiments of the present disclosure represent significant improvements over traditional systems, making RV travel a more pleasant experience for enthusiasts.

Embodiments of the present disclosure may include a hose extension handle system with a tubular grip that further includes a first and second end. The first end may include a cavity configured to hold a battery securely within a battery carrier. Additionally, an engageable actuator may be located on the outer surface of the tubular grip's first end or along other portions of the body of the tubular grip, allowing for electrical communication with the battery. The tubular grip's second end may connect to a housing that angles away from it. Within this housing may be a light source, which may also be electrically connected to both the battery and the actuator. Extending from the housing may be two arms forming an upper strap, and a lower strap that can be attached to these arms. This configuration may encircle and secure a hose around the hose's circumference, with the light source positioned to illuminate the hose's interior. Further embodiments of the present disclosure may include a hose extension handle system wherein the tubular grip and the housing are a single feature.

Additional features of the hose extension handle system may include a lens placed over the light source and attached to the housing, where the light source may be aimed away from both the grip and the housing. Embodiments may also include a transparent hose extender configured to be secured arounds its circumference by the upper strap when it's secured to the lower strap, wherein the transparent hose extender may be configured to attach to a recreational vehicle's black water outlet hose. Embodiments may further include a flow sensor located within the housing, aimed toward the lower strap, alongside a flow rate indicator on the grip, which may provide an alert to the user if the flow sensor detects a flow rate below or above a set threshold. The upper strap's two arms may also create a semi-circular shape.

Further embodiments of the present disclosure may include a handle system with a grip that has a first and second distal end. A power source may be located in a cavity within the first distal end, and an actuator, connected to the power source, may extend beyond the first distal end's edge. Further, a light source may be positioned in a housing that extends from the second distal end of the grip, with a circular arm extending from the housing.

Additional components of the handle system may include a light source oriented towards the radial center of the circular arm and a configuration wherein the circular arm can detach into an upper and lower circular arm. The power source, actuator, and light source may be electrically connected. Embodiments of the housing may project perpendicularly from the second distal end, with a lens covering the light source attached to the housing. Some embodiments may also include a transparent hose extender that can be secured around its circumference by the circular arm.

Further embodiments of the present disclosure may include a multi-purpose handle for a transparent black water hose extender. The multi-purpose handle may include a ridged grip with a capped first distal end and flush second distal end. The multi-purpose handle may also include a removable battery carrier configured to secure two or more batteries, disposed in a sealable cavity within the capped first end of the grip. The removable battery carrier may be covered by an engageable button in electrical communication with the two or more batteries disposed within an outer surface of the capped first distal end of the grip. The flush second distal end may include a housing extending at an angle from the flush second distal end of the grip. The housing may include a light source disposed within the housing at the furthest end of the housing from the flush second distal end of the grip and in electrical communication with the engageable button and the two or more batteries. The light source may be covered by a lens, secured in a water-tight manner, and disposed over the light source and affixed to the housing. The multi-purpose handle may further include a first strap forming two arms that each extend away from the housing that form a semi-circle, wherein each end of the two arms further includes a releasable attachment and a second strap forming a singular semi-circle that is releasably attached to the ends of the two arms of the first strap and configured to engage the circumference of a transparent black water hose extender when secured. The light source may be positioned within the housing so as to illuminate an interior portion of the transparent black water hose.

Additional components of the multi-purpose handle may include a light source aimed at the transparent black water hose extender. Embodiments may also feature a flow sensor within the housing, targeting the hose extender, and a flow rate indicator on the grip, which may be positioned between the capped first distal end and the flush second distal end, and configured to provide an alert if the flow rate falls below or raises above a threshold level. The flow rate indicator may be a colored LED light. The capped first distal end may have a removable cap that can open the sealable cavity. Further, embodiments that include a releasable attachment may include a screw, pin, hook, or similar detachable attachment mechanism on the arms of the first strap.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 13 is an example diagram showing a perspective view of a battery or power source carrier housing, in accordance with various embodiments of the disclosed technology.

FIG. 14 is an example diagram showing a perspective view of a contact spring, in accordance with various embodiments of the disclosed technology.

FIG. 15 is an example diagram showing a perspective view of a light source, in accordance with various embodiments of the disclosed technology.

FIG. 16 is an example diagram showing a perspective view of a lens, in accordance with various embodiments of the disclosed technology.

Figure 1:
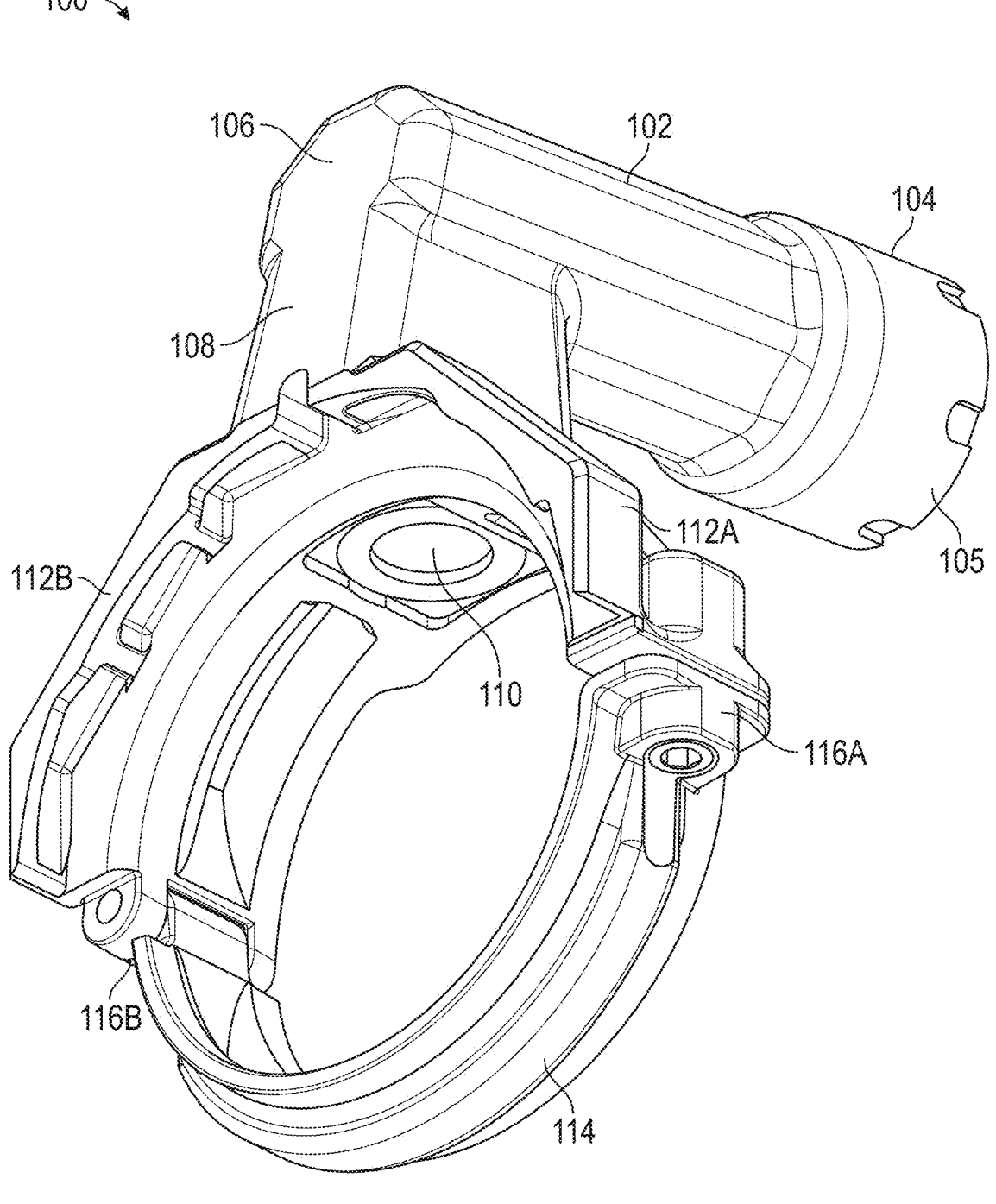
FIG. 1 is an example diagram showing a perspective illustration of a hose extension handle system, in accordance with various embodiments of the disclosed technology.

The figures are not exhaustive and do not limit the present disclosure to the precise form disclosed.

DETAILED DESCRIPTION

The present disclosure responds to the significant challenges faced by recreational vehicle (RV) enthusiasts in managing water systems efficiently and hygienically, particularly concerning the disposal of wastewater or black water. Traditional methods, which rely on the use of a sewer fitting wrench for connecting a sewer hose to a disposal inlet, are fraught with difficulties, including the risk of misplacing the wrench, insecure connections leading to potential leaks, and the wrench detaching during use. These issues not only increase the complexity of waste disposal but also raise the risk of environmental contamination and unsanitary conditions. Furthermore, the task is made even more challenging at night due to the lack of adequate lighting, necessitating the use of separate light sources to improve visibility and a secure connection. The disclosed hose extension handle system, with its integrated lighting and secure attachment features, offers an improved solution to these problems, enhancing safety, convenience, and hygiene during the waste disposal process.

More generally in the realm of hose management and utility, ensuring efficient, hygienic, and convenient operation stands as a universal challenge across various applications. From garden watering to industrial fluid transfer, the need for innovative solutions to manage hoses effectively is evident. It is against this backdrop of hose management issues that the hose extension handle system emerges as a versatile solution, designed to address not only the specific needs of RV enthusiasts in managing black water but also broader applications for hose-related activities where efficiency, hygiene, and convenience are paramount.

Embodiments of the present disclosure discuss a hose extension handle designed to enhance the utility and functionality of hose usage in various settings. Some embodiments of the disclosure are specifically tailored to work in combination with a transparent hose extension, providing a user with an improved experience in holding, monitoring, and managing the flow of substances through the hose. Further embodiments may be designed to be integrated, molded, and/or permanently affixed to a hose extension or sewer hose, eliminating challenges related to locating and handling a separate fitting wrench.

The hose extension handle system may include a tubular grip, which may serve as a primary handling point. Some embodiments of the present disclosure may be used with black water systems, like those found in RVs. As such, a separate handling point may be preferred to remove the user a distance from the hose carrying black water or sewage. The grip may include a first end and a second end, which may promote ergonomic handling and control. The first end of the tubular grip may include a cavity crafted to house a battery, battery carrier, and/or a power source carrier housing. The carrier may be secured by a carrier housing or may be placed directly in the cavity. The carrier may be of a geometry to securely hold a battery or power source, thus powering the system.

Various embodiments of the present disclosure may include an engageable actuator, strategically positioned on the outer surface of the tubular grip, including on the tubular grip's first end. This actuator may be in electrical communication with the battery, allowing the user to more easily control the system's electronic functions. A light source, such as an LED, may be placed within a housing that extends angularly from the second end of the tubular grip. The light source may also be in electrical communication with the engageable actuator and the battery, designed to illuminate when activated. Additional embodiments of the handle system may not include a light source and may embody the other handling features of the present disclosure.

To secure the hose extension handle to a hose, an upper strap with two arms may extend away from the housing, coupled with a lower strap that can be releasably secured to the arms of the upper strap via a releasable attachment. This configuration may allow for a more secure fit around the circumference of a hose, improving stability and ease of use. The positioning of the light source within the housing may be such that it illuminates an interior portion of the transparent hose, providing a clearer view of the hose's contents, especially in low light settings. Alternative embodiments of the system may include variations in the design of the tubular grip for different ergonomic preferences, multiple light sources for increased visibility, a flow sensor for increased awareness of the flow rate through the hose, and/or adjustable straps for compatibility with hoses of various diameters, improving the system's versatility and applicability across a wide range of hose-related activities.

Referring now to the figures, FIG. 1 is an example diagram showing a perspective illustration of a hose extension handle system 100, in accordance with various embodiments of the disclosed technology. The hose extension handle system 100 (also referred to throughout as a handle system and/or a multi-purpose handle for a transparent black water hose extender) may include a tubular grip 102, delineated by a first end 104 and an opposing second end 106. Within the first end 102, a cavity may be engineered (though not visible in FIG. 1) to accommodate a battery carrier, power source, and/or power source carrier housing (discussed below in relation to FIGS. 13 & 18), which can be secured within the tubular grip 102 using a cap 105. Protruding from the second end 106 may be a housing 108, which may serve as a foundation for a light source 110 positioned therein. The light source 110 may connect electrically to the battery or power source disposed within the first end 104 of the tubular grip 102, ensuring illumination capability.

Figures 2, 3:
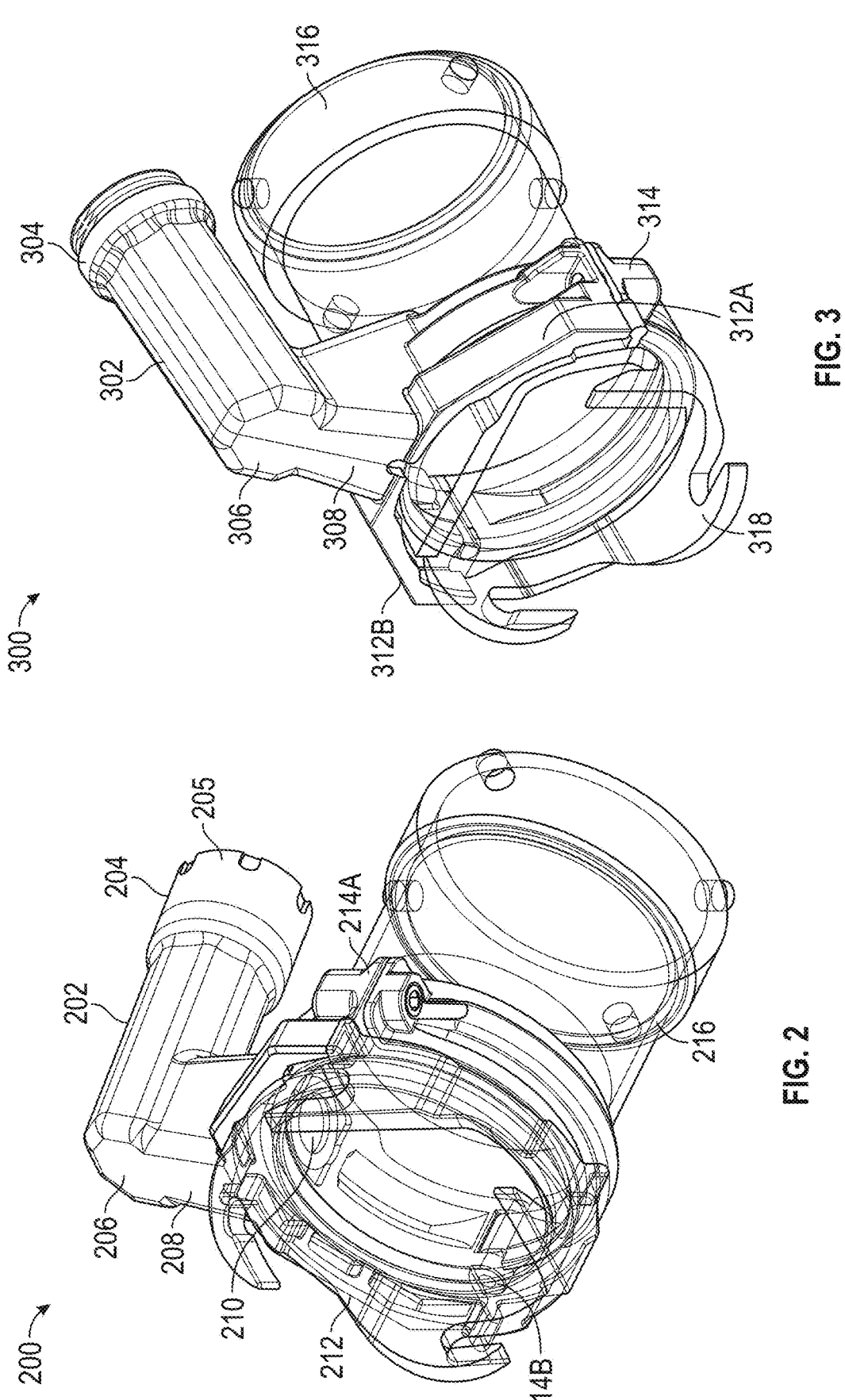
FIG. 2 is an example diagram showing a lowered perspective illustration of a hose extension handle system secured around the circumference of a hose extension, in accordance with various embodiments of the disclosed technology.
FIG. 3 is an example diagram showing a raised perspective illustration of a hose extension handle system secured around the circumference of a hose extension, in accordance with various embodiments of the disclosed technology.

Additionally, the housing 108 may be an attachment point for an upper strap, which may include two arms 112A, 112B. These arms may project from the housing 108, with the first upper strap 112A extending laterally before curving into a quarter circle away from the housing 108, and the second upper strap 112B mirroring this trajectory in the opposite direction, as illustrated in FIG. 1. The combination of the first and second upper strap 112A, 112B may form a substantially semi-circular shape and may individually include various geometries. A lower strap 114 may detachably connect to the arms of the upper strap 112A, 112B, allowing it to encircle and securely fasten around the circumference of a hose (as illustrated in FIGS. 2 & 3, discussed below).

Embodiments of the present disclosure may include a tubular grip 102 that may be constructed from a molded plastic. The tubular grip 102 may serve various functions in the hose extension handle system 100. For example, the tubular grip 102 may provide a foundational holding point for a user, while also housing a battery or power source that may power the system. Ergonomically designed, the tubular grip 102 may be, at least in part, of a cylindrical geometry to improve the user's ability to maintain a firm and comfortable grasp of the system. However, to accommodate diverse user preferences and ergonomic needs, the geometry of the tubular grip 102 may not be limited to cylindrical forms; alternatively, the tubular grip may be shaped into various geometries that form to the user's hand. The surface of the tubular grip 102 may include ridges, planes, or other textural features to decrease slippage and improve user control of the system. For example, the tubular grip 102 may include peaks and valleys on a lower portion of the tubular grip 102, such that a user's fingers could be placed within the valleys to further improve grip. Further embodiments may include a tubular grip 102 that includes angles or bends therein, such that a user could hold the tubular grip at an angle to provide increased torque on the system, for example, in applications relating to industrial fluid transfer.

In addition to molded plastic, other material such as rubber, silicon, polycarbonate, and various composites may be used alone or in combination to construct the tubular grip 102. The tubular grip 102 may be constructed in various sizes, ranging from 1 inch to 10 inches in length, and 0.25 inches to 4 inches in diameter. The disclosed lengths are merely exemplary, other lengths and widths may also exist.

Embodiments of the tubular grip 102 may include a first distal end 104 and a second distal end 106. The first distal end 104 may include a cavity, which may serve as a secure location for housing the battery or power source. The first distal end 104 may also be shaped to accommodate a cap 105, which may screw onto, press onto, or similarly re-attach to the first distal end 104. The cap 105 may be of a larger circumference than the tubular grip 102, allowing for the cap 105 to be placed over a portion of the tubular grip 102 for securement. The second distal end 106, as illustrated in FIG. 1, may include a substantially flat or flush end, which may provide for a smooth transition into the housing 108 (as discussed below). The second distal end 106 may be at an opposite end (lengthwise) of the tubular grip 102 from the first distal end 104, and may not be limited to the flush configuration. Alternative embodiments may include other shapes that permit a transition between the tubular grip 102 and the housing 108, and may include other features located on the second distal end 106, for example, a second light source, a fluid-splash prevention shield (e.g., a material surface extending beyond the system to protect a user's hands from splash from the fluid or contents transferred by the hose), and/or an additional grip for increased holding capacity. The first distal end 102, second distal end 106, and cap 105 may be constructed from the same or similar materials as the tubular grip 102.

Additional embodiments of the tubular grip 102 may include a flow rate indicator (not shown) disposed on the tubular grip 102 and configured to provide an alert when a flow sensor (discussed below) measures a flow rate below a threshold value. The flow rate indicator may be a colored LED light or other similar light source. Further, the flow rate indicator may be electrically connected to the battery or power source, and/or the engageable actuator. For example, the flow rate indicator may be connected to the engageable actuator such that it only provides an alert when the engageable actuator is depressed and the light source is on (as discussed below). The flow rate indicator may further be electrically connected to a flow rate sensor.

Embodiments of the present disclosure may include a housing 108 extending from the second distal end 106 of the tubular grip 102. The housing 108 may be approximately square or rectangular, featuring rounded or square edges to cater to varying aesthetic and functional preferences. Situated at the bottom of the housing, or the point furthest from the second distal end 106, the housing may incorporate a light source 110. The internal structure of the housing may be hollow or include channels (not shown), such that the housing can accommodate electrical connections such as wires, circuitry, and/or printed circuit boards (PCBs) that electrically connect the light source to the battery disposed within the first distal end 104 of the tubular grip 102. This hollow or channeled design both protects these connections and provides an unobstructed pathway for electrical communication throughout the system. Extending from the housing 108 may be an upper strap 112A, 112B, which may project outward and away from the housing 108. The housing 108 may be constructed from the same or similar materials to those used in the tubular grip 102, or may be constructed from other materials suitable for its desired use.

Embodiments of the present disclosure may include a light source 110 disposed within the housing 110 and in electrical communication with the battery in the first distal end 104 of the tubular grip 102. The light source 110 may be oriented away from the housing 108, such that when the system is affixed around a transparent hose, the illumination produced by the light source 110 may be directed into the hose's interior. This placement of the light source 110 may enhance visibility within the hose, facilitating monitoring and management of its contents. To safeguard the light source 110, a lens (not shown) may be mounted over the light source 110 and securely attached to the housing 108. The lens may be affixed to the housing 108 in a water-proof or sealable manner, such that it substantially prevents moisture and/or debris from reaching the light source 110. The light source 110 may be selected from a range of lighting and illumination devices, such as, for example, LED lights, incandescent bulbs, halogen lamps, or similar lighting systems. In further embodiments, multiple light sources may be included in the system, including additional light sources positioned on the upper strap 112A, 112B extending away from the housing 108 (or radially toward the center of the hose), on the side of the housing 108, on a portion of the tubular grip 102, or on the lower strap 114. Such embodiments may include a single light source placed in a different position than depicted in FIG. 1, or may include multiple light sources placed at various points around the housing, other locations on the tubular grip, upper, and lower straps. The light source 110 may be electrically connected to the battery via internal wiring within the housing 108.

Embodiments of the present disclosure may include an upper strap (collectively 112A, 112B) with a first arm 112A and second arm 112B extending therefrom. The upper strap 112A, 112B may play a role in securing the system around a hose. Each arm of the upper strap 112A, 112B may include a releasable attachment 116A, 116B at the end furthest from the housing 108, which may facilitate application and removal from the hose. Each arm may extend away from the housing 108, positioned on opposite sides of the housing 108, such that each arm may embody a quarter-circle-like shape. This geometric design may allow the arms together to envelop approximately half of the hose's circumference. The curvature of a lower side of each arm may be such that it closely contacts a portion of the hose's outer surface when secured. The curvature on the lower side of the arms may be complemented by the versatility in shape of an upper side of the arms, which may vary in shape from being angularly flat to having a stepped profile. This variability may allow for adaption to different hose diameters and shapes, enhancing the system's utility across a wide range of applications. Furthermore, the arms may be flat across their length or incorporate openings, which may reduce the overall weight of the system without comprising its structural integrity.

Additionally, alternative embodiments may include various or adjustable lengths of the upper strap's arms 112A, 112B. This may allow for the system to secure hoses with varying diameters. In other words, the upper strap 112A, 112B may be adjustable such that a single handle system can be used to secure hoses of various diameters. Moreover, the upper straps 112A, 112B may be constructed from the same or similar materials as the tubular grip 102, or may be constructed from materials suitable for its desired use. For example, the material composition of the lower side of each arm may be altered to vary the friction or slippage of the arm against the surface of a hose. In some embodiments, materials that increase friction and reduce slippage may be used to enhance the system's stability when secured around a hose. These materials may range from textured rubbers to silicone-based composites (as well as other materials with high friction coefficients). Conversely, for application where movement along the hose is necessary or desired, materials with lower friction coefficients may be employed, facilitating easier adjustment and repositioning of the system along the hose's length. These materials may be used to construct part of the upper strap, such as a layer formed on top of molded plastic, or may be used to construct the entirety of the upper strap.

Embodiments of the present disclosure may include a lower strap 114. The lower strap 114 may complement the functionality of the arms of the upper strap 112A, 112B. The lower strap may be of a geometry similar to a half-circle, such that its inner surface may engage the outer surface of a hose. Each end of the lower strap 114 may connect to the corresponding releasable attachment 116A, 116B found on the ends of the upper arms 112A, 112B, which may improve the fit around the hose. The lower strap 114 may be constructed from materials similar to those used for the upper strap 112A, 112B and tubular grip 102, or may be constructed from materials suitable for its desired use. Alternatively, the lower strap 114 may be made from other materials that may be more flexible than the upper strap 112A, 112B such that the lower strap 114 may form to varying size hoses without adjusting length. The length of the lower strap 114 may be calculated based on the size hose with which securement is desired. In other words, the length of the lower strap 114 may correspond to the necessary length required to encircle the perimeter of the hose not contacted by the upper strap 112A, 112B. Alternative embodiments of the lower strap 114 may include wiring and/or additional light sources disposed therein.

Additional embodiments of the housing 108, upper strap 112A, 112B, and lower strap 114 may include a flow sensor disposed within the housing, upper strap, or lower strap, and directed toward the hose extender. The flow sensor may detect a flow rate within the hose secured by the handle system. In particular, the flow sensor may measure the rate, quantity, color, viscosity, temperature, and/or other fluid-based measurements, of the contents of the hose. The flow sensor may be in electrical communication with the flow rate indicator, which may provide an alert if the flow sensor measures a fluid-based measurement above or below a desired threshold. For example, an alert may be produced if the flow rate of the contents falls below a desired rate, indicating that the output tank is nearly empty. Alternatively, an alert may be produced if the flow rate of the contents rises above a desired rate, indicating that a blockage in a line has been cleared.

Embodiments of the present disclosure may include releasable attachments 116A, 116B on the ends of each arm 112A, 112B of the upper strap, which may adjustably and/or releasably connect to the lower strap 114. These attachments may allow for quick modification or detachment of the system from a hose. Among the variety of detachable mechanisms that may be used, screws or bolts provide a robust connection through threaded engagement, requiring rotation for attachment or detachment. Further embodiments may use pins, which may slide into place through aligned holes and feature a locking mechanism such as a retainer clip to prevent accidental release, which may necessitate a pull or push for engagement or disengagement. Further embodiments may use hooks, which may offer a latch-and-release method by catching onto a loop or ring, improving a manual connection and disconnection process. Further embodiments may use magnetic attachments that may utilize attraction forces for tool-free joining. Further embodiments may use buckle mechanisms that function by inserting and clicking into place a strap with a release. Further embodiments may use Velcro, known for its reusability and ease of adjustment, involving pressing together to attach and pulling apart to detach. Other attachment mechanisms may also be used so long as they are repeatably detachable.

Some embodiments may include systems where both sides of the attachment release fully, facilitating a complete separation of the upper and lower straps. Alternatively, some embodiments may include one side that features a lever mechanism that permits the attachment to open like a hinge, enabling a user to position the system around a hose without total detachment. In further embodiments, the upper and lower straps may be a singular strap that forms a circle around a hose, which does not separate into an upper and lower strap.

Embodiments of the present disclosure may be manufactured as a single piece. For example, the combined component features of the system may be molded from a single piece of plastic, forming the various features as discussed. Alternatively, embodiments of the present disclosure may be manufactured in separate pieces and combined to form the structure of the system. Further embodiments, either manufactured as a single piece or multiple pieces, may include the integrated lighting system, as described, or may not include the integrated lighting system. Embodiments that do not include the integrated lighting system, may include the remaining component features and provide a handle, a distinct distance from, a hose extension that may be attached thereto.

FIGS. 2 & 3 provide example diagrams showing a lowered perspective illustration and raised perspective illustration, respectively, of a hose extension handle system 200, 300 secured around the circumference of a hose extension 216, 316, in accordance with various embodiments of the disclosed technology. Similar to FIG. 1, the hose extension handle system 200, 300 may include a tubular grip 202, 302 with a first end 204, 304 and a second end 206, 306. Notably, FIG. 2 illustrates an embodiment of the hose extension handle system 200 with a cap 205 screwed onto the first end 204, whereas FIG. 3 illustrates an embodiment of the hose extension handle system 300 without a cap screwed onto the first end 304. The hose extension handle system 200, 300 may further include a housing 208, 308 angularly extending from the tubular grip 202, 302, with FIG. 2 further illustrating the light source 210 at the base of the housing 208. Of note, the housing 208, 308 may extend perpendicularly from the tubular grip 202, 302 or may extend at an angle (e.g., 1 degree to 89 degrees off the perpendicular axis). Embodiments of the hose extension handle system 200, 300 may include an upper strap forming two arms 212, 312A, 312B, which further may include a releasable attachment 214A, 214B, 314 at the base of each arm 212, 312A, 312B. As depicted in FIGS. 2 & 3, the upper strap, via the two arms 212, 312A, 312B, may be secured around the perimeter or circumference of a transparent hose extension 216, 316. The transparent hose extension 216, 316 may further include teeth 318 to secure the end of the transparent hose extension 216, 316 to matching inlet or disposal connection.

Figures 4, 5:
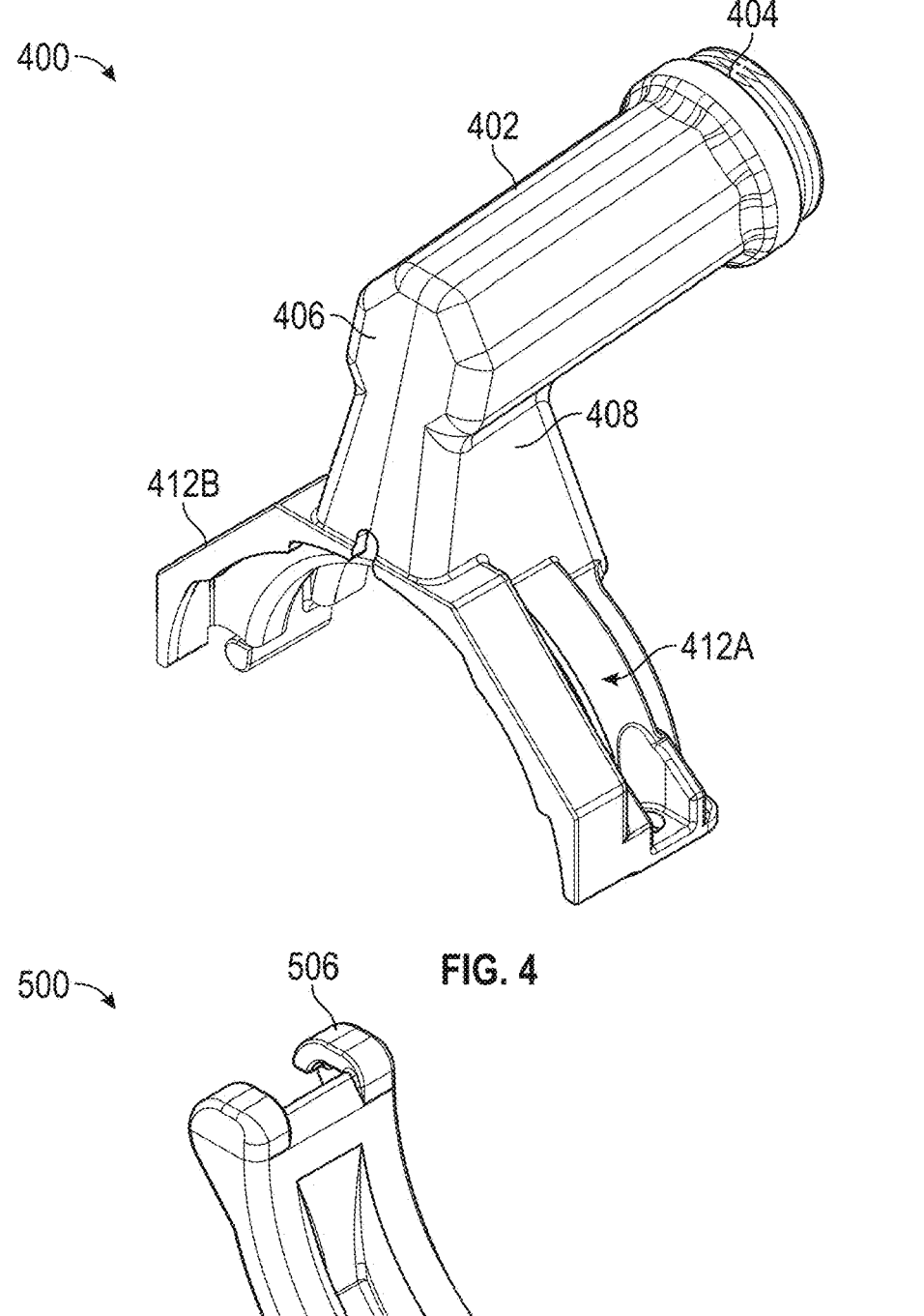
FIG. 4 is an example diagram showing a perspective illustration of a tubular grip with a first end and a second end, a housing angularly extending from the second end of the tubular grip, and an upper strap forming two arms that each extend away from the housing, in accordance with various embodiments of the disclosed technology.
FIG. 5 is an example diagram showing a perspective illustration of a lower strap that can be releasably secured to the two arms of the upper strap and configured to engage the circumference of a hose when secured, in accordance with various embodiments of the disclosed technology.

FIG. 4 is an example diagram showing a perspective illustration of the hose extension handle system 400 including a tubular grip 402 with a first end 404 and a second end 406, a housing 408 angularly extending from the second end 406 of the tubular grip 402, and an upper strap forming two arms 412A, 412B that each extend away from the housing 408, in accordance with various embodiments of the disclosed technology. As depicted in FIG. 4, embodiments of the present disclosure may include handle systems where both arms of the upper strap disconnect from the lower strap (shown in FIG. 5).

FIG. 5 is an example diagram showing a perspective illustration of a portion of the handle system 500 including a lower strap 502 that can be releasably secured to the two arms of the upper strap and configured to engage the circumference of a hose when secured, in accordance with various embodiments of the disclosed technology. The lower strap 502 may include a first releasable attachment 504 and a second releasable attachment 506 on opposite sides of the lower strap 502, as depicted in FIG. 5. The first and second releasable attachments may connect to their counterparts on the first and second arms 412A, 412B of the upper strap, as depicted in FIG. 4 and described in relation to FIG. 1. When connected, the upper and lower straps may secure together such that when a hose is placed therein, the upper and lower straps secure around the perimeter or circumference of the hose. Using the releasable attachment, the upper strap and lower strap may be detached from each other such that the handle system 400 may be removed from the hose. Furthermore, as depicted in FIGS. 4 & 5, the releasable attachment may be different from one side to the other. For example, a first side 504 may include two aligned tapped holes, which when placed together, allow for a screw or pin to pass therethrough, whereas a second side 506 may include a hook and bar system that can rotate along the bar, such that the first side 504 may detach without the second side 506 detaching. In further embodiments, both sides may releasably detached. In further examples, an Allen head screw may pass through a hole in the upper arm 412A and screw into an over molded brass (or other material) nut in the first releasable attachment 504.

Figures 6, 7:
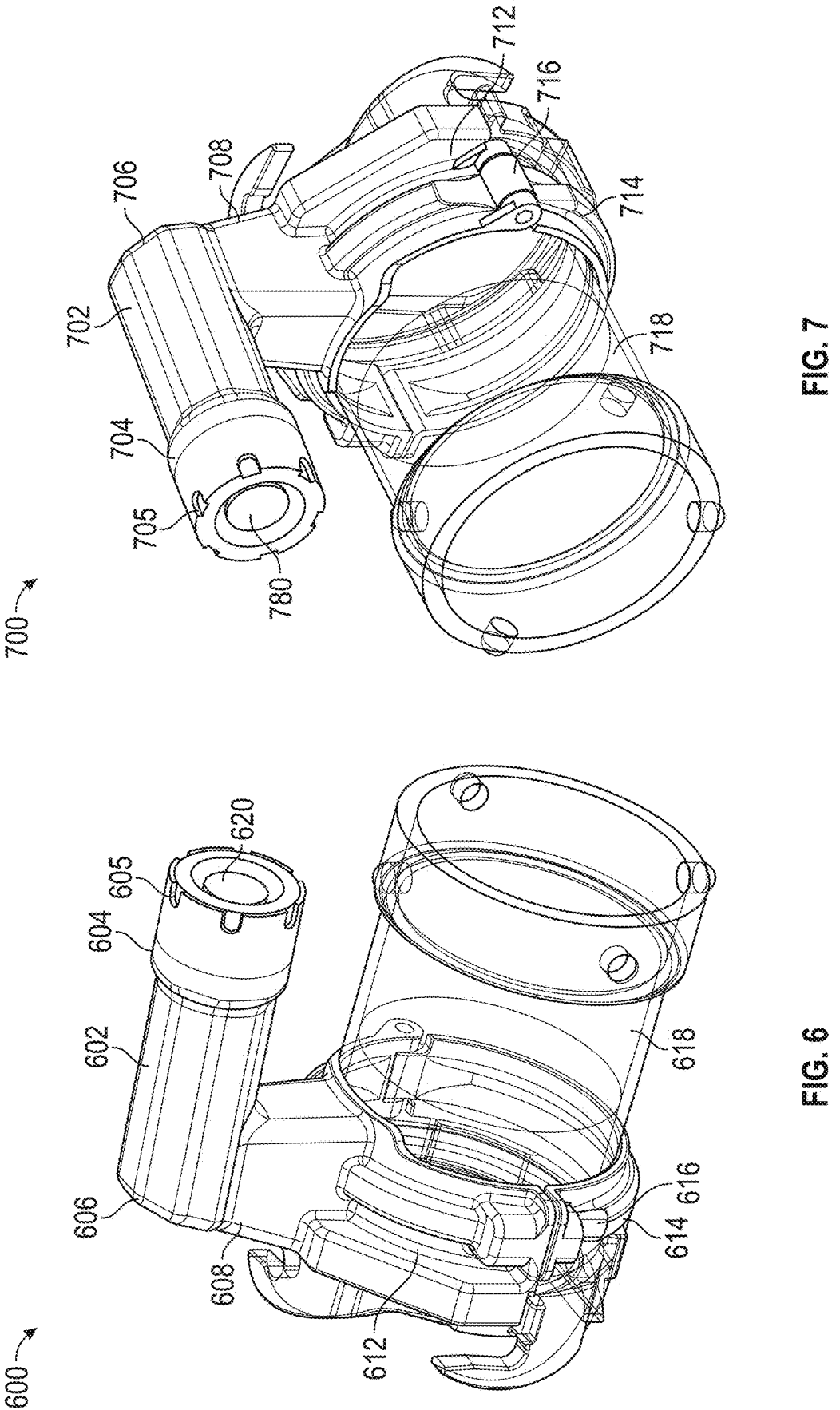
FIG. 6 is an example diagram showing a side-angle perspective view of a hose extension handle system secured around the circumference of a hose extension, in accordance with various embodiments of the disclosed technology.
FIG. 7 is an example diagram showing a rear-side perspective view of a hose extension handle system secured around the circumference of a hose extension, in accordance with various embodiments of the disclosed technology.

FIGS. 6 & 7 are example diagrams showing different side-angle perspective views of a hose extension handle system 600, 700 secured around the circumference of a hose extension 618, 718, in accordance with various embodiments of the disclosed technology. Similar to FIG. 1, embodiments of the hose extension handle system 600, 700 as illustrated in FIGS. 6 & 7, may include a tubular grip 602, 702 with a first end 604, 704, and a second end 606, 706. However, notably, FIGS. 6 & 7 further illustrate the engageable actuator 620, 720, which may be disposed on the outer surface of the first end 604, 704, of the tubular grip 602, 702. The second end 606, 706 may include a housing 608, 708 extending away from the tubular grip 602, 702 with an upper strap 612, 712 further extending away from the housing. The upper strap 612, 712 may be connected to a lower strap 614, 714 via a releasable attachment 616, 716, such that when the upper strap 612, 712 is attached to the lower strap 614, 714 it secures around the perimeter of a hose extension 618, 718. The hose extension 618, 718 may be clear/transparent, partially clear, and/or opaque. For example, the hose extension constructed of a colored material, e.g., green. Some embodiments of the hose extension 618, 718 may not be transparent, but rather include a window through which illumination can reach the interior of the hose extension.

Figures 8, 9, 10:
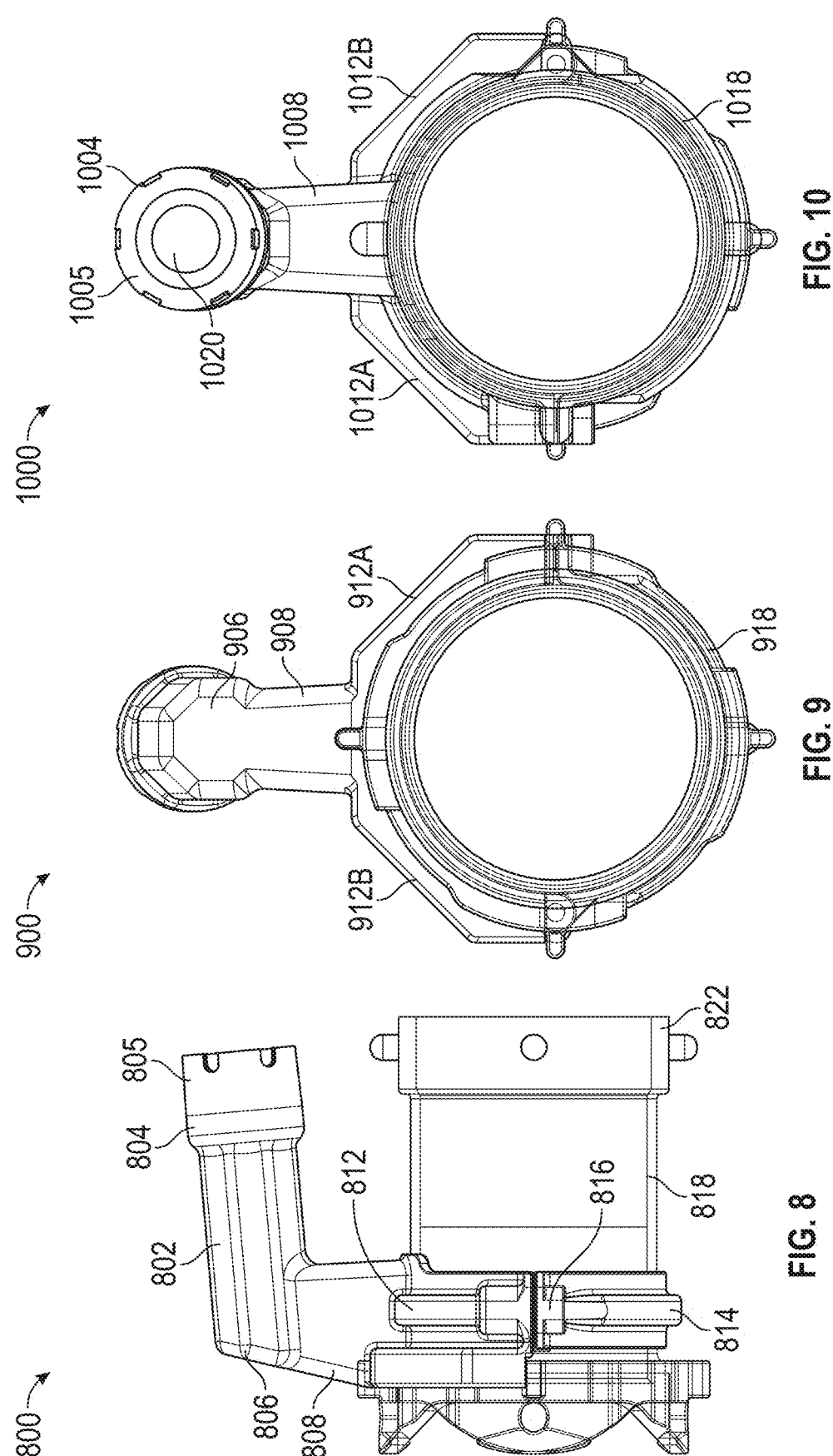
FIG. 8 is an example diagram showing a side view of a hose extension handle system secured around the circumference of a hose extension, in accordance with various embodiments of the disclosed technology.
FIG. 9 is an example diagram showing a front view of a hose extension handle system secured around the circumference of a hose extension, in accordance with various embodiments of the disclosed technology.
FIG. 10 is an example diagram showing a rear view of a hose extension handle system secured around the circumference of a hose extension and further including an engageable actuator disposed on an outer surface of the first end of a tubular grip, in accordance with various embodiments of the disclosed technology.

FIG. 8 is an example diagram showing a side view of a handle system 800 secured around the circumference of a hose extension 818, in accordance with various embodiments of the disclosed technology. Embodiments of the handle system 800 may include a grip 802 with a first distal end 804 and a second distal end 806. The first distal end 804 may include a cap 805. The cap 805 may cover a cavity formed into the first distal end 804 of the grip 802. Inside the cavity may be a power source or battery. The first distal end

804 may further include an actuator connected to an external end of the battery and extending beyond an edge of the first distal end 804 of the grip 802. A light source may be disposed within a housing 808 extending from the second distal end 806 of the grip 802. Embodiments of the handle system 800 may further include a circular arm 812, 814 extending away from the housing 808. Further embodiments may include a circular arm that detaches into an upper semi-circular arm 812 and a lower semi-circular arm 814. The circular arm 812, 814 may encircle the perimeter or circumference of a hose or tube extension 818. The hose extension may be configured to connect to another hose via a female junction 822. The female junction 822 may connect to a corresponding male junction on an output hose. The male and female junctions may be exchanged for one another in further embodiments.

FIGS. 9 & 10 are example diagrams showing a front view and rear view, respectively, of a hose extension handle system 900, 1000 secured around the circumference of a hose extension 918, 1018, in accordance with various embodiments of the disclosed technology. The hose extension handle system 900, 1000 may include a first distal end 1004 with a cap 1005 and an actuator 1020, and a second distal end 906 with a housing 908, 1008 extending therefrom. The housing 908, 1008 may further include an upper strap including two arms 912A, 912B, 1012A, 1012B that each extend away from the housing 908, 1008. The upper strap may connect to a lower strap (not shown) such that the combination of strap encircles a hose extension 918, 1018 around its perimeter.

Figure 12:
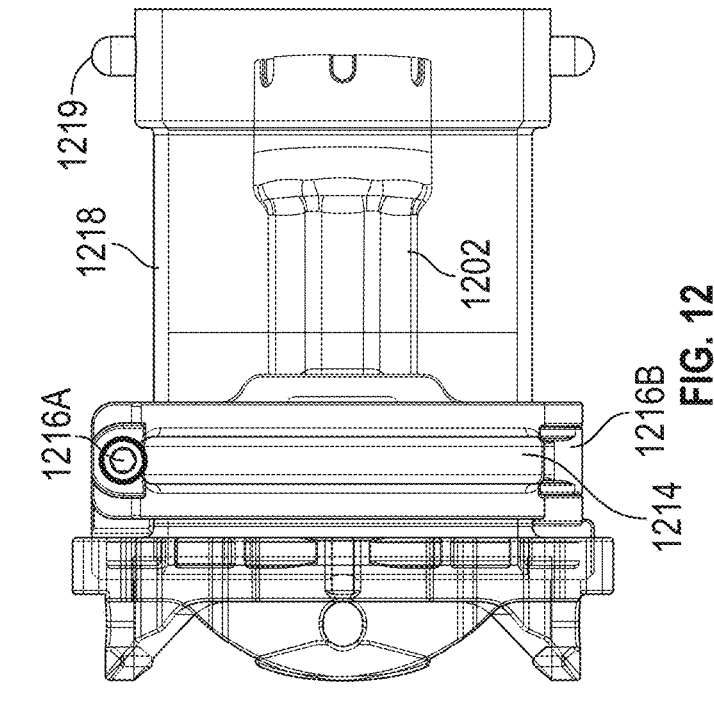
FIG. 12 is an example diagram showing a bottom-up view of a hose extension handle system secured around the circumference of a hose extension, in accordance with various embodiments of the disclosed technology.
Figure 11:
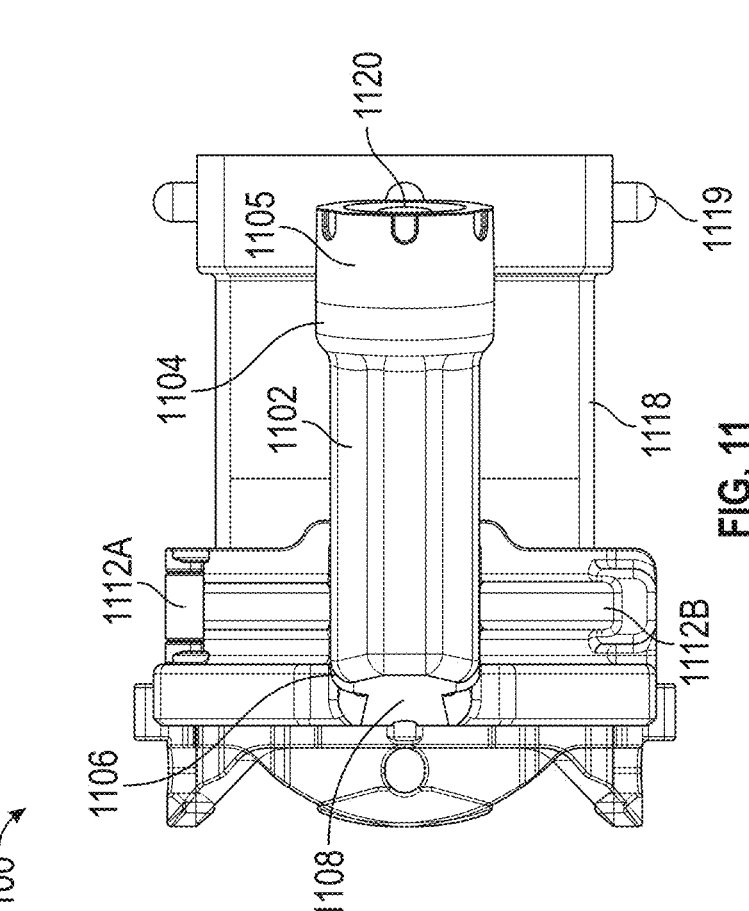
FIG. 11 is an example diagram showing a top-down view of a hose extension handle system secured around the circumference of a hose extension, in accordance with various embodiments of the disclosed technology.

FIGS. 11 & 12 are example diagrams showing a top-down view and a bottom-up view, respectively, of a multi-purpose handle for a transparent black water hose extender 1100, 1200 secured around the circumference of a transparent hose extension 1118, 1218, in accordance with various embodiments of the disclosed technology. Embodiments of the multi-purpose handle for a transparent black water hose extender 1100, 1200 may include a ridged grip 1102, 1202 with a capped 1105 first distal end 1104 and a flush second distal end 1108. A removable battery carrier (not shown) may be configured to secure two or more batteries in a sealable cavity (not shown) within the capped 1105 first distal end 1104 of the grip 1102, 1202. Further embodiments may include an engageable button 1120 in electrical communication with the two or more batteries disposed within the first capped 1105 distal end 1104 of the grip 1102, 1202. Further embodiments may include a housing 1108 extending at an angle from the flush second distal end 1106 of the grip 1102, 1202. The housing 1108 may include a light source (not shown) disposed within the housing and at the furthest end of the housing 1108 from the flush second distal end 1106 and in electrical communication with the engageable button 1120 and the battery. A lens (not shown), secured in a water-tight manner, may be disposed over the light source and affixed to the housing 1108. Embodiments may further include a first strap 1112A, 1112B forming two arms that each extend away from the housing 1108 that may form a semi-circle, and a second strap 1214, which may form a singular semi-circle that may be releasably attached to the ends of the arms of the first strap 1112A, 1112B by a releasable attachment 1216A, 1216B and configured to engage the circumference of a transparent black water hose extender 1118, 1218 when secured. Certain embodiments of the transparent black water hose extender 1118, 1218 may include a connection 1119, 1219 at the end such that the extender can connect to an output hose.

FIG. 13 is an example diagram showing a perspective view of a battery or power source carrier housing 1300, in accordance with various embodiments of the disclosed technology. The power source carrier housing 1300 may be an intermediary component that holds a battery carrier (as discussed in relation to FIG. 18) before its insertion into the cavity of the tubular grip (as discussed in relation to FIG. 1). The power source carrier housing 1300 serves several functions: first, it may act as a protective shell for the battery carrier, shielding it from physical damage and environmental factors, and second, it may facilitate a more streamlined insertion process into the tubular grip. The power source carrier housing 1300 may include a body 1302, which may be substantially tubular, with an opening 1304 at one end. The opening 1304 may include a ridge 1306, which may extend radially away from the body 1302. The body 1302 may further include one or more ridges or metal strips 1308, which may connect the contact spring on the open end of the battery or power source carrier housing to an electrical contact on the opposite end of the carrier housing, the metal strip 1308 may also be a wire. The battery or power source carrier housing 1300 may be constructed from the same or similar materials to the tubular grip or the battery carrier, as discussed below.

FIG. 14 is an example diagram showing a perspective view of a contact spring 1400, in accordance with various embodiments of the disclosed technology. The contact spring 1400 may be placed inside of the power source carrier housing or in combination with the battery carrier to provide an electrical connection from one end of the battery. The contact spring 1400 may include a base platform 1404, from which conductors 1408 extend, and a spring 1402, which may be configured to depress when physically engaged. The contact spring 1400 may also include a position tab 1406 to secure the contact spring 1400 in place.

FIG. 15 is an example diagram showing a perspective view of a light source 1500 in accordance with various embodiments of the disclosed technology. Embodiments of the light source 1500 may be disposed within the housing of the handle system and include a light 1508, a base 1506, wiring 1504, and electrical connections 1502. The light 1508 may emit illumination as described in relation to FIG. 1. The base 1506 may support and secure the light 1508 within the housing. The wiring 1504 may electrically connect the light 1508 to the battery via the electrical connections 1502, which may run through the hollow or channeled housing.

FIG. 16 is an example diagram showing a perspective view of a lens 1600, in accordance with various embodiments of the disclosed technology. The lens 1600 may include a rim 1602, which may connect to the base of the light source and improve the sealing ability, a frame 1604, which may affix to the housing of the handle system, and an aperture 1606, which the illumination from the light source may pass through. The rim 1602 or frame 1604 may include a rubber bushing or sealant to further improve water tightness.

Figures 17, 18:
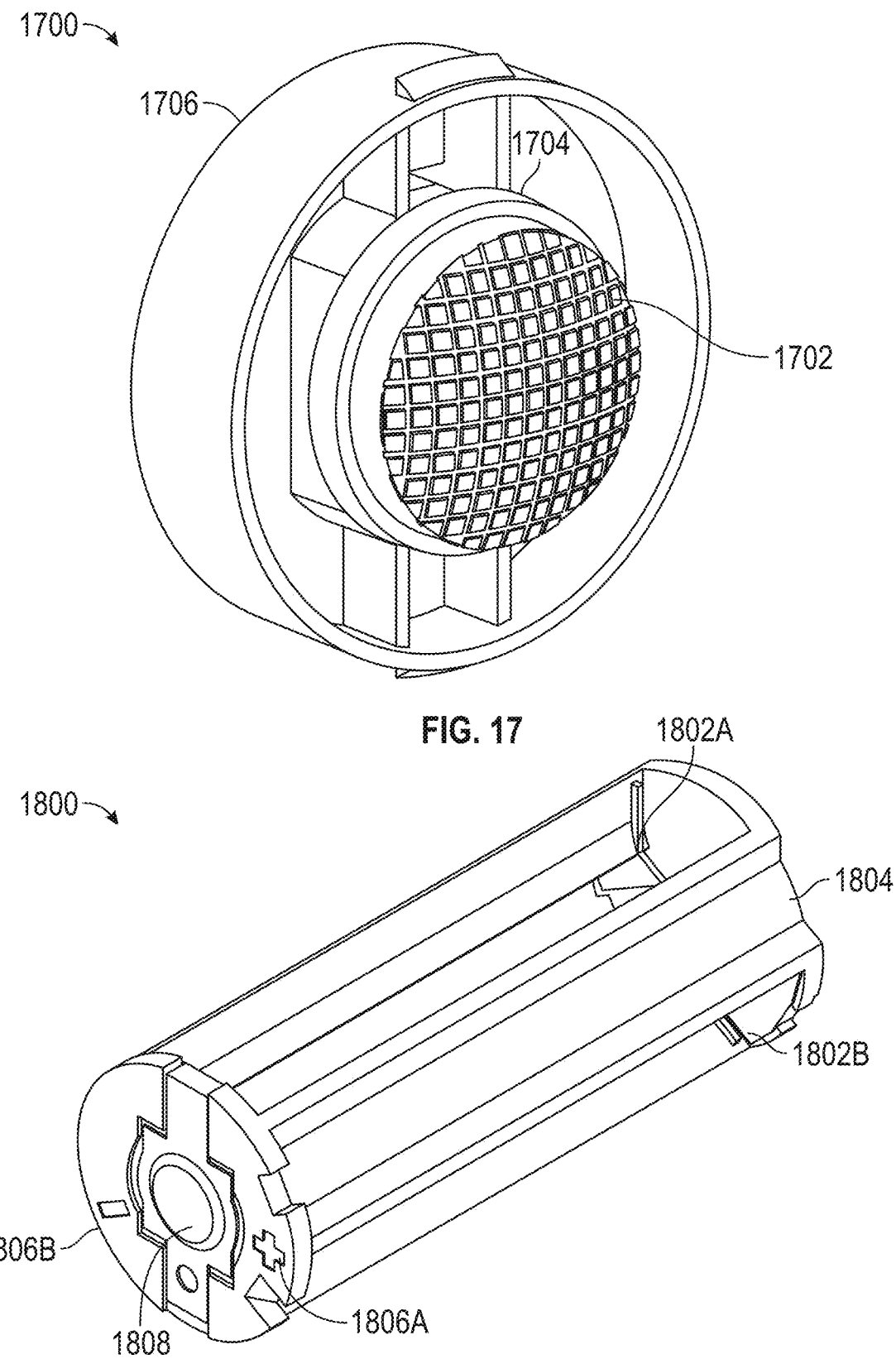
FIG. 17 is an example diagram showing a perspective view of an engageable actuator, in accordance with various embodiments of the disclosed technology.
FIG. 18 is an example diagram showing a perspective view of a battery carrier or power source carrier, in accordance with various embodiments of the disclosed technology.

FIG. 17 is an example diagram showing a perspective view of an engageable actuator 1700, in accordance with various embodiments of the disclosed technology. The engageable actuator 1700 may include a engageable actuator cover 1702, a frame 1704, and a switch. The engageable actuator cover 1702 may be textured and may depress when physically engaged by a user. The engageable actuator cover 1702 may be constructed from rubber. The frame 1704 may secure the engageable actuator cover 1702 to the switch 1706, which may further be secured within the first end of the tubular grip (e.g., tubular grip 102 of FIG. 1). The frame

1704 may also extend outward laterally from the engageable actuator cover 1702, such that when a cap (e.g., cap 105 of FIG. 1) is tightened onto the first end of the tubular grip, the cap secures the engageable actuator 1700 within the hose extension handle system. The switch 1706 may be in electrical communication with the battery and light, and may be repeatably engageable such that depression of the engageable actuator cover 1702 may turn on, turn off, or change modes of the light source.

The engageable actuator 1700 may be a button. For example, the engageable actuator may be depressed by applying physical pressure in a similar manner to a button on a flashlight. The engageable actuator 1700 may also be other forms of an actuator, such as a lever, switch, circuit, and/or other feature that can repeatably engage electrical communication between elements in a circuit via direct physical interaction. The engageable actuator 1700 may be pressed more than one time to cycle through other light modes, such as varying brightness levels, blinking light patterns, other light colors, other lights on the system, and so on. The system may also include a feature to automatically turn off the light source, without engaging the engageable actuator, after a defined amount of time.

Further embodiments may include an engageable actuator that is a slider, push button, toggle, butterfly, or other switch configuration. For example, the engageable actuator may be moved from a first, lower position, to a second, higher position, by applying physical pressure. Such an engageable actuator, along with other forms of engageable actuators, may be placed in other locations on the system, for example, an engageable actuator may be located on any outer surface of the tubular grip and/or housing. Additional embodiments may include more than one engageable actuator, where each engageable actuator controls a different lighting function of the system in, for example, embodiments with two or more lights.

The engageable actuator 1700 may be in electrical communication with the power source (e.g., batteries or battery carrier), which may be disposed within the tubular grip. The engageable actuator 1700 may close an electrical circuit when engaged or depressed, such that electrical current can run from the power source or batteries to the light source within the housing. Further, when the engageable actuator 1700 is depressed a second time, it may disconnect the electrical circuit, such that electrical current no longer runs from the power source or batteries to the light source within the housing. In other words, by pressing the engageable actuator 1700, a user may "turn on" or "turn off" the light source disposed within the housing.

FIG. 18 is an example diagram showing a perspective view of a battery carrier 1800 or power source carrier, in accordance with embodiments of the disclosed technology. The battery carrier 1800 may be designed to hold and/or manage a variable number of batteries or power sources, ranging from a single unit to as many as eight units, allowing it to meet diverse power requirements. For example, the battery carrier 1800 may hold three AAA batteries. The battery carrier 1800 may hold a range of power sources, which can include one or more of a battery or batteries (such as, e.g., Li-ion, Li-Polymer, NiMH, NiCd, NiZn, and NiH2, to name a few, whether rechargeable or primary), fuel cells, power banks, supercapacitors, solid-state batteries, graphene batteries, and similar power sources. Such embodiments with rechargeable batteries may include rechargeable batteries that are permanently installed into the system and charged via a cable plugged into the system or charged through wireless charging methods. The battery carrier 1800 may be designed to insert into a designated cavity of the hose extension handle system, encouraging a secure fit and reliable electrical connection. Further embodiments may be configured to the power source secured in the housing or tubular grip.

The battery carrier 1800 may include various chambers 1802A, 1802B that may have a corresponding geometry to the shape of specific batteries intended to be secured within the battery carrier 1800. For example, a first AAA battery may be placed in a first chamber 1802A and a second AAA battery may be placed in a second chamber 1802B. The chambers 1802A, 1802B may be connected by a case 1804, which may separate the battery chambers 1802A, 1802B by a discrete and uniform distance. In other embodiments, the case may separate the battery chambers 1802A, 1802B by a variable and non-uniform distance.

For embodiments of the battery carrier 1800 that accommodate multiple batteries, the battery carrier 1800 may further include indicators 1806A, 1806B for the correct orientation of the batteries' positive and negative terminals. For example, a first battery may be oriented with its positive terminal toward a first end of the battery carrier 1800, corresponding with a positive terminal indicator 1806A, whereas a second battery may be oriented with its negative terminal toward the first end of the battery carrier 1800, corresponding with a negative terminal indicator 1806B. The inclusion of such alignment indicators underscores the carrier's user-centric design, improving straightforward and correct battery insertion based on polarity. This feature can prove especially useful in situations where swift and precise battery installation is critical, for example, while servicing an RV's water systems in the dark.

The battery chambers 1802A, 1802B and the case 1806 may be constructed from high-grade plastics, such as ABS (Acrylonitrile Butadiene Styrene), polycarbonate, or other materials known for their strength, resilience, and electrical insulation properties.

The battery carrier 1800 may also include a conductor area 1808 that establishes electrical communication between the inserted batteries and the rest of the hose extension handle system. The conductor area 1808 may be constructed from materials with high electrical conductivity, such as copper or aluminum. A combination of these metals may be chosen for their balance between conductivity, cost-effectiveness, and resistance to corrosion. The conductor area 1808 may contact a corresponding conductor within the cavity of the hose extension handle system when the engageable actuator 1700 of FIG. 17 is depressed, and may disengage from the corresponding conductor within the cavity of the hose extension handle system when the engageable actuator 1700 of FIG. 17 is depressed a second time.

Figure 19:
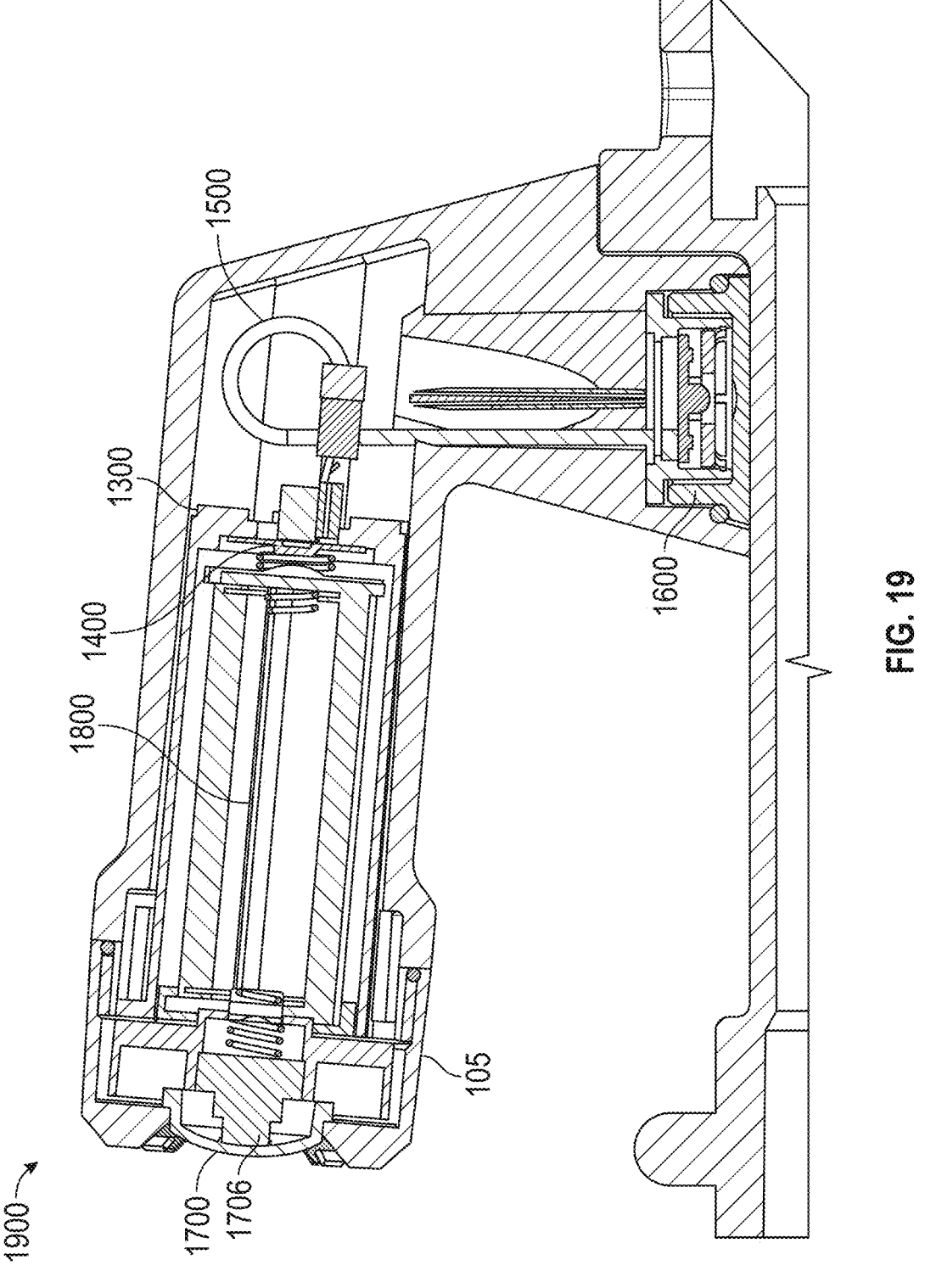
FIG. 19 is an example diagram showing a skeleton side plan view of a hose extension handle system, in accordance with various embodiments of the disclosed technology.

FIG. 19 is an example diagram showing a skeleton side plan view of a hose extension handle system 1900, in accordance with various embodiments of the disclosed technology. FIG. 19 may depict a skeleton or "cut through" embodiment of the hose extension handle system. Such a depiction may provide insight into the configuration and/or placement of various component features of the disclosed technology. For example, the hose extension handle system 1900 may include a cap 105 that may enclose a battery carrier 1800, which may further be secured by a battery carrier housing 1300. The battery carrier 1800 and housing 1300 may engage a contact spring 1400 that, when engaged, provides power from the batteries to the light source 1500. The light source 1500 may illuminate through a lens 1600. Illumination of the light source 1500 may be controlled by depressing an engageable actuator 1700, which controls a switch 1706. Other configurations of the component features of the disclosed technology may exist. For example, embodiments may include multiple light sources or no light source at all.

Figure 20:
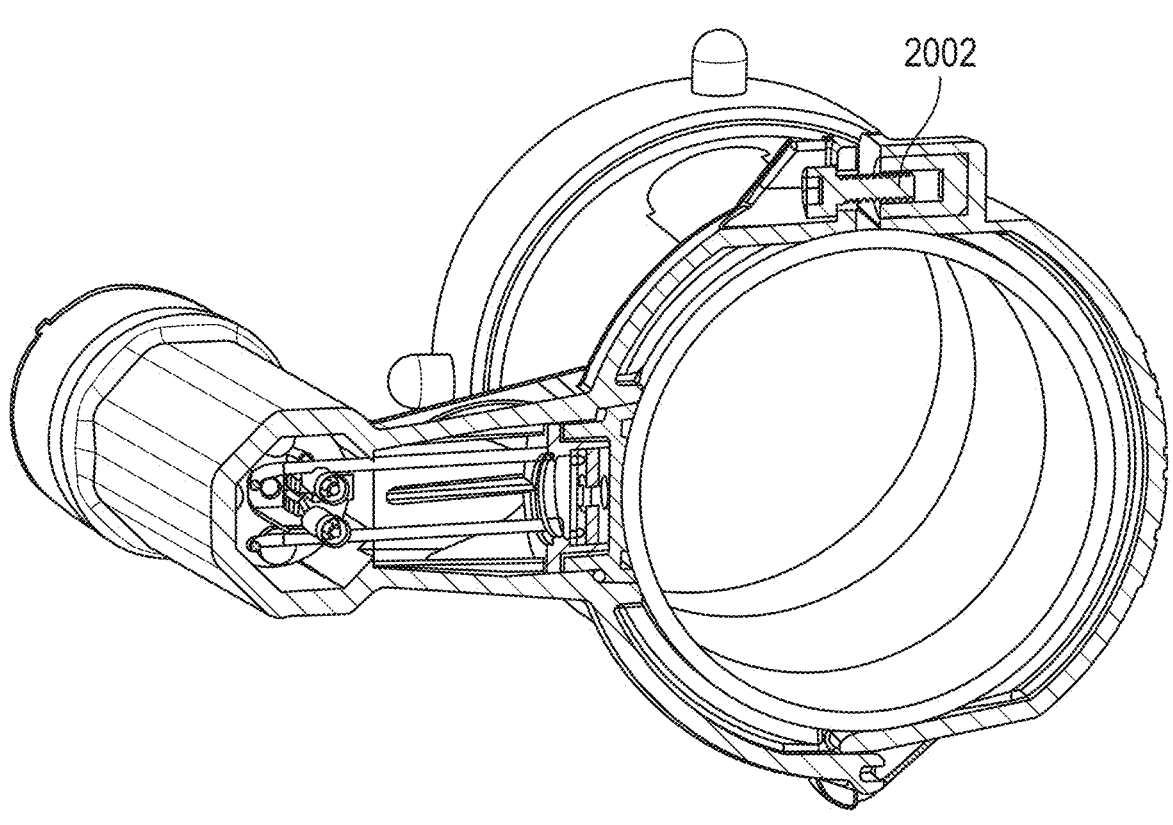
FIG. 20 is an example diagram showing a skeleton front perspective view of a hose extension handle system, in accordance with various embodiments of the disclosed technology.

FIG. 20, is an example diagram showing a skeleton front perspective view of a hose extension handle system 2000, in accordance with various embodiments of the disclosed technology. As discussed in relation to FIG. 5, the upper and lower arms may be releasably secured together using an Allen head screw 2002.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

The terms "approximately" and "substantially" are used to account for variations that may occur due to manufacturing tolerances, measurement inaccuracies, and other practical considerations in implementing the described technology. The term "approximately" refers to a value or range that is close to the stated value but allows for minor deviations, typically within ±10%, unless otherwise specified, that do not materially affect the function or purpose of the invention. Similarly, the term "substantially" is used to indicate that a particular feature, characteristic, or result is largely present or achieved, with allowable variations without deviating from the intended scope and function of the invention. These terms should be interpreted in a manner consistent with the understanding of a person skilled in the art.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A hose extension handle system, comprising:
a tubular grip with a first end and a second end;
a battery carrier of a geometry to secure a battery, disposed in a cavity within the first end of the tubular grip;
an engageable actuator in electrical communication with the battery disposed on an outer surface of the tubular grip;
a housing angularly extending from the second end of the tubular grip;
a light source disposed within the housing in electrical communication with the engageable actuator and the battery;
an upper strap forming two arms that each extend away from the housing; and
a lower strap releasably secured to the two arms of the upper strap,
wherein the lower strap is configured to engage a circumference of a hose when secured, and
wherein the light source is positioned within the housing so as to illuminate an interior portion of the hose.

2. The system of claim 1, further comprising a lens disposed over the light source and affixed to the housing.

3. The system of claim 1, wherein the light source is directed away from the tubular grip.

4. The system of claim 1, wherein the hose is a hose extension configured to be secured around its circumference by the upper strap when secured to the lower strap.

5. The system of claim 4, wherein the hose extension is configured to attach to a recreational vehicle's (RV's) black water outlet hose.

6. The system of claim 1, further comprising:
a flow sensor disposed within the housing and directed toward the lower strap; and
a flow rate indicator disposed on the tubular grip and configured to provide an alert when the flow sensor measures a flow rate below a threshold value.

7. The system of claim 1, wherein the two arms of the upper strap form a circumference of a semi-circle.

8. A handle system, comprising:
a grip with a first and second distal end;
a power source disposed in a cavity formed into the first distal end of the grip;
an actuator connected to an external end of the power source and extending beyond an edge of the first distal end of the grip; and
a light source disposed in a housing extending from the second distal end of the grip and a circular arm extending away from the housing for mating to a hose.

9. The system of claim 8, wherein the light source is directed toward a radial center of the circular arm.

10. The system of claim 8, wherein the circular arm is releasable, such that the circular arm is configured to separate into an upper semi-circular arm and a lower semi-circular arm.

11. The system of claim 8, wherein the power source, the actuator, and the light source are in electrical communication.

12. The system of claim 8, wherein the housing extends perpendicularly away from the second distal end.

13. The system of claim 8, further comprising a lens disposed over the light source and affixed to the housing.

14. The system of claim 8, further comprising a hose extension configured to be secured around its perimeter by the circular arm.

15. A multi-purpose handle for a transparent black water hose extender, comprising:
a ridged grip with a capped first distal end a flush second distal end;
a removable battery carrier configured to secure at least one battery, disposed in a sealable cavity within the capped first distal end of the ridged grip;
an engageable button in electrical communication with the at least one battery disposed within an outer surface of the capped first distal end of the ridged grip;
a housing extending at an angle from the flush second distal end of the ridged grip;
a light source disposed within the housing at a furthest end of the housing from the flush second distal end of the ridged grip and in electrical communication with the engageable button and the at least one battery;
a lens, secured in a water-tight manner, and disposed over the light source and affixed to the housing;
a first strap forming two arms that each extend away from the housing that form a semi-circle, wherein each end of the two arms further comprises a releasable attachment; and
a second strap forming a singular semi-circle that is releasably attached to the ends of the two arms of the first strap and configured to engage a circumference of the transparent black water hose extender when secured,
wherein the light source is positioned within the housing so as to illuminate an interior portion of the transparent black water hose extender.

16. The multi-purpose handle of claim 15, wherein the light source is directed toward the transparent black water hose extender.

17. The multi-purpose handle of claim 15, further comprising:
a flow sensor disposed within the housing and directed toward the transparent black water hose extender; and
a flow rate indicator disposed on the ridged grip, in between the capped first distal end and the flush second distal end, and configured to provide an alert when the flow sensor measures a flow rate below a threshold value.

18. The multi-purpose handle of claim 17, wherein the flow rate indicator is a colored LED-light.

19. The multi-purpose handle of claim 15, wherein the capped first distal end further comprises a removable cap configured to open the sealable cavity when removed.

20. The multi-purpose handle of claim 15, wherein the releasable attachment is a screw, pin, or hook.

* * * * *